INVENTOR
Harry S. Jones

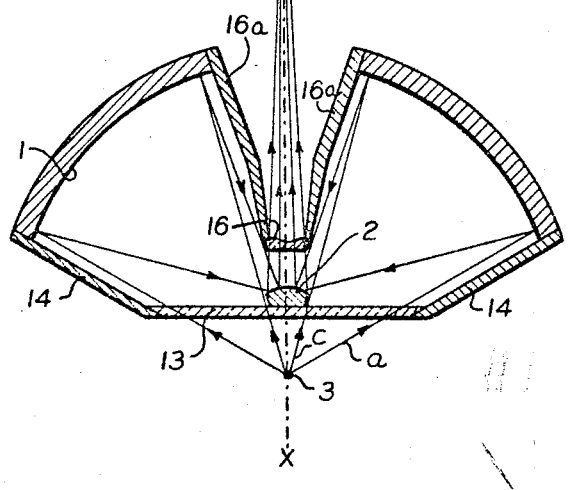
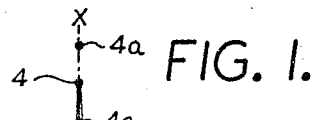
FIG. 1.
FIG. 2.
FIG. 3.
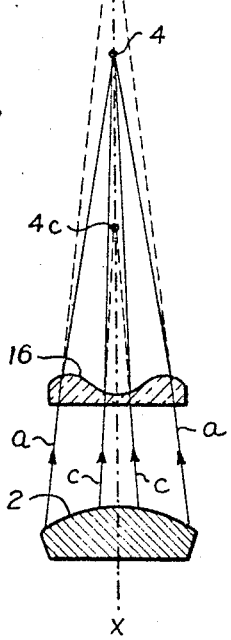
FIG. 1A.
FIG. 4.
INVENTOR
Harry S. Jones July 8, 1969   H. S. JONES   3,454,686
METHOD OF SHAPING AN ASPHERIC LENS
Filed Oct. 29, 1964   Sheet 2 of 3

INVENTOR

Harry S. Jones

United States Patent Office 3,454,686
Patented July 8, 1969

3,454,686
METHOD OF SHAPING AN ASPHERIC LENS
Harry S. Jones, 933 Hudson St., Hoboken, N.J. 07030
Filed Oct. 29, 1964, Ser. No. 407,586
Int. Cl. B29d 11/00; C03b 19/00
U.S. Cl. 264—1                                    7 Claims

ABSTRACT OF THE DISCLOSURE

Method of producing aspheric, symmetrical lenses by placing an electrically conductive fluid lens-forming material in a suitable electrically conductive container, disposing concentric conductive elements proximate to the fluid lens-forming material and spaced thereafter, applying an electrostatic field from said conductive elements to said container, whereby varying the shape of said fluid lens-forming material adjusting the distance between the conductive elements and the fluid whereby to adjust the shape of said fluid and then solidifying said lens-forming materials.

---

Several improvements upon the Reflective Optical System invention described in my copending patent application, Ser. No. 327,763, now abandoned, are described herein. The simple two-mirror system described in my copending application will give excellent results when the wavelength of the radiation used is in the infrared or short microwave region and the numerical aperture is not over 0.65. However, when the numerical aperture approaches 1.0 and the wavelength is in the range of visible light it is necessary to add a corrective element to the two mirrors described in my copending patent application to obtain diffraction-limited resolution.

One improvement is a corrective element which may be added to the new and novel combination of two carefully-spaced spherical reflective optical mirrors to construct a microscope objective of the maximum possible numerical aperture having maximum theoretical resolution using visible and ultra violet radiation. A simple non-mathematical means for developing and constructing corrective elements is also described. When used in reverse, that is, when the light ray directions are reversed, this new reflective optical system may be used as a telescope objective of extremely low effective F/number and of very high optical resolution. When used as a microscope objective the following improvements over existing microscope objectives are provided:

(1) Spherical aberration is compensated up to the highest numerical apertures.

(2) The working distance is substantially increased relative to that of a conventional refractive type objective.

(3) Chromatic aberration is eliminated, for all practical purposes, due to the use of reflective optical components which require minimum correction by refractive means.

(4) Only two spherical reflective surfaces are utilized with a single refractive corrector of unique construction.

(5) Ultra violet and visible radiation may be used since images are produced primarily by reflective type optical components and since the action of the corrector is secondary.

(6) No mathematical computations are required to design the optical system.

Since a reflective type microscope objective of the type described herein does not provide a flat refractive first element, as in the case of the first surface of the first lens of a conventional refractive type of microscope objective, it is not possible to utilize high numerical apertures (usually above N.A.=0.65) without significant loss of resolution when the specimen is under a cover glass. This loss is due to the refraction that occurs when light from the specimen passes from the cover-glass to air. The effect of such refraction is to reduce the numerical aperture of the reflective type objective. In the case of conventional refractive type objectives this condition is corrected by replacing the air between the cover-glass and the flat surface of the first lens element of the objective by a thin layer of oil of high refractive index. This procedure is commonly known as oil immersion. Another improvement upon my copending invention is a means for obtaining the advantages of conventional oil immersion in reflective type optical systems of the type described herein, particularly those used as microscope objectives.

In the drawings, which form a part hereof, like reference characters indicate corresponding parts in all figures. Since this invention is related to the invention described in my copending patent application, Ser. No. 327,763, the same numbers are used for all parts that are the same in this patent application and in the copending application.

FIGURE 1 is a sectional schematic optical diagram showing the addition of a refractive corrector element to the basic reflective optical system.

FIGURE 1A is a sectional schematic optical diagram showing the manner in which the corrector compensates the residual spherical aberration of the basic reflective optical system.

FIGURES 2, 3 and 4 show various forms of refractive correctors.

CORRECTOR ELEMENTS

Figure 5A:
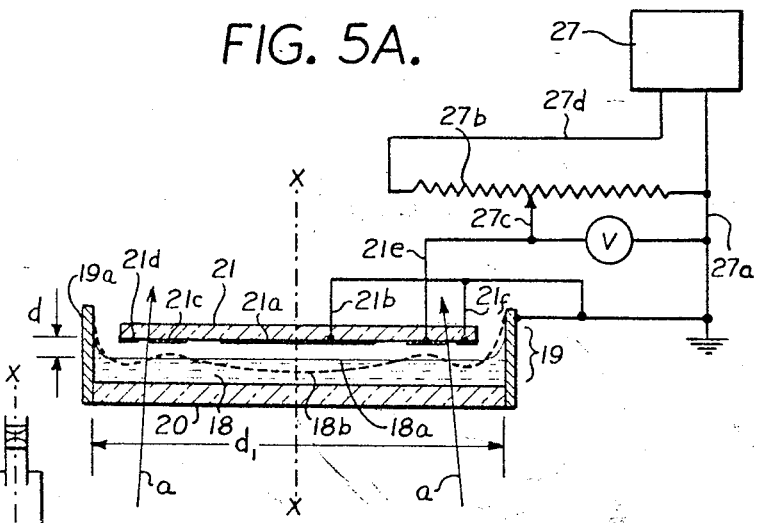
FIGURE 5A is an enlarged view of the electrostatic forming portion of the system shown in FIGURE 5.

The reflective portion of the optical system used in this invention is described in my copending patent application, Ser. No. 327,763 and is illustrated by means of FIGURES 1 to 11 inclusive in that patent application. In this patent application FIGURE 1 is very similar to FIGURE 11 in the copending patent application.

In the system shown in FIGURE 1 a primary concave spherical mirror 1 and a secondary convex spherical mirror 2 are spaced relative to each other as described in my copending patent application so that the rays from a point 3 located on the optical axis X—X will fall close to a point 4 on the optical axis X—X. However, due to resdual amounts of axial spherical aberration, rays from an object point 3 will converge at various points along the optical axis X—X between points 4a and 4c as shown by the dotted lines on FIGURE 1A. Due to over-compensation of the spherical aberration of mirror 1 by mirror 2 the peripheral rays a will fall at point 4a which is at a greater distance from mirror 2 than rays c which rall at point 4c. Point 4 will lie between points 4a and 4c and may be considered the position of the image circle of least confusion corresponding to object point 3. Mirror 2 may be fastened to a transparent window 13 which is supported by a suitable structure 14. To those skilled in the art it will be clear that all rays from object point 3 may be made to converge at a single image point 4 if a refractive corrector 16 of suitable aspheric curvature is inserted between convex mirror 2 and image point 4 by means of a support 16a as shown in FIGURE 1. In practice such a corrector should preferably be located as close as possible to mirror 2 in order to minimize off-axis errors.

It will be noted that the type of corrector required and shown in FIGURES 1 and 1A is opposite to the Schmidt, Maksutov or Bouwers types, each of which causes the peripheral rays to diverge relative to the axial rays. Therefore, none of such correctors will be useful in this invention and a new type of corrector such as shown in FIGURES 1, 1A, 2, 3 and 4 must be utilized. While the correctors shown in FIGURES 2, 3 and 4 are closely-equivalent forms of the type of corrector required, corrector 3 is preferable since with this type of corrector refraction and, hence, chromatic aberration are minimized. The curves of the correctors shown in FIGURES 1, 1A, 2, 3 and 4 have been exaggerated for the purpose of illustration. While all such correctors might be curved on both surfaces it will be clear that the work of design and construction may be simplified by utilizing one flat and one curved side as shown in FIGURES 1, 1A, 2, 3 and 4.

To those skilled in the art it will be clear that not only the design but the construction of correctors is difficult and time-consuming. However, the means and method described below permit highly-satisfactory correctors to be derived and produced entirely by experimental means without mathematical computation and without grinding or polishing of the aspheric surfaces of the correctors. This method was conceived after consideration of those natural static forces which might be used to produce liquid surfaces which are aspheric figures of revolution. These natural forces are:

(1) Surface tension forces.
(2) Electrostatic forces.
(3) Centrifugal forces.
(4) Gravitational forces.
(5) Pressure forces.
(6) Combinations of the above forces.

The use of pressure forces is not preferred since, within an incompressible fluid, such forces are constant in all directions under static conditions and, therefore, must be used in combination with other forces to be useful. Although centrifugal forces are considered potentially useful they are not preferred due to the mechanical complexity associated with rotary apparatus. The combination of surface tension, gravitational and electrostatic forces was therefore selected as a preferred means for producing aspheric corrector surfaces since electrostatic forces are capable of control over a very wide range and since gravitational and surface tension forces are ever-present.

Figure 5B:
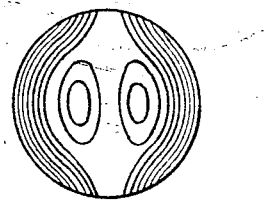
FIGURES 5B, 5C and 5D illustrate various types of shadow fringes which may be seen via the optical test system.
Figure 5C:
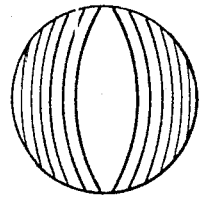
Figure 5D:
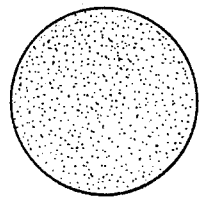
Figure 5:
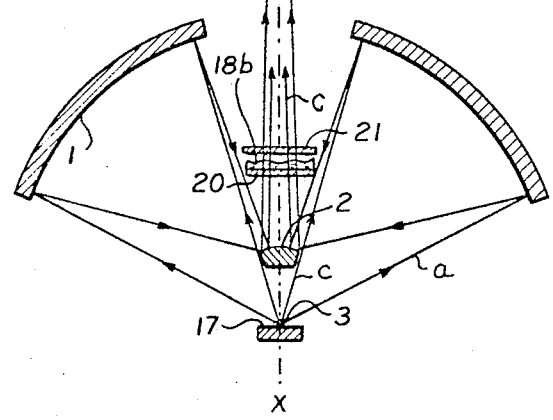
FIGURE 5 is a combination sectional schematic optical diagram and schematic electrical diagram showing an optical test system together with experimentally adjustable means for the electrostatic forming of liquid corrector elements.

Referring to FIGURES 5 and 5A, a primary concave mirror 1 and a secondary convex mirror 2 are spaced as described in my copending patent application while the surface 18a of liquid 18 is flat and with axis X—X oriented in a vertical position. A small flat mirror 17 is located perpendicular to optical axis X—X at the point normally occupied by object point 3. A small amount of a transparent liquid 18 which conducts electricity sufficiently well to equalize changes in electrical charge rapidly (preferably within not over a few seconds) is supported within a small dish 19 having a circular electrically-conducting side wall 19a and a plane-parallel transparent bottom 20 located in a horizontal position perpendicular to optical axis X—X.

To achieve electrostatic deformation of the liquid surface in combination with surface tension and gravitational forces an optically-flat glass window 21 is located in a horizontal position perpendicular to axis X—X and is spaced a distance d from the normally-flat surface 18a of liquid 18. A ruled glass grid 22 having in the order of 50 to 200 lines/inch and having equal opaque and transparent line widths (or any other suitable pattern) is located perpendicular to axis X—X at point 4 where the smallest image circle-of-confusion of an object point 3 is located when the surface of liquid 18 is flat, as designated by line 18a. A small telescope 23, or other magnifier, having its optical axis coincident with axis X—X is focused upon a region slightly above or below the curved surface of convex secondary mirror 2. This is not a critical focus. The grid test pattern 22 is illuminated by means of a light source 24, condenser lenses 25 and a beam-splitter 26. This arrangement comprises a new form of optical test set-up that is comparable with but different from the auto-collimating test set-up used to test telescope optical systems.

Referring to FIGURE 5A, it will be seen that upon the side of window 21 adjacent to liquid 18 a central disc 21a of highly-transparent but electrically-conducting material such as gold or antimony is deposited. Such coatings may be so thin that they are practically invisible while at the same time their electrical resistance is in the order of a few tens of megohms per square. Such a coating provides more than sufficient conductivity to equalize changes in electrical charge over the area of disc 21a "instantly," for all practical purposes. Electrical connection to electrically-conducting disc 21a is made by means of a thin wire 21b inserted in a small hole through plate 21 or by other suitable means. Wire 21b should, preferably, be maintained perpendicular to disc 21a and window 21 on the side away from liquid 18 in order to eliminate undesired electrical fields due to wire 21b itself. Similarly, two outer transparent, electrically-conducting rings 21c and 21d are also provided on the liquid-adjacent side of window 21. These rings and the central disc 21a are accurately located so that their common centers are coincident with optical axis X—X. Wires 21e and 21f provide electrical connections to rings 21c and 21d, respectively. Wires 21b and 21f and conducting wall 19a of dish 19 are connected to the grounded side of a stable DC voltage supply 27 via conductor 27a and wire 21e is connected to potentiometer resistor 27b via an adjustable contact element 27c. Potentiometer resistor 27b is connected at one end to ground conductor 27a and at the other end to voltage supply 27 via conductor 27d. The electrical connections between potentiometer 27b and central disc 21a and one or more concentric rings such as 21c and 21d are made by very thin wires that obscure a negligible portion of the light used in the optical test system.

When the surface of liquid 18 is flat, as designated by line 18a, an observer using telescope 23 will observe numerous fringes which appear more or less as shown in FIGURE 5B. However, when a voltage V is applied between ring 21c and the electrically-conducting liquid 18 the surface of liquid 18 will assume a curve of the form indicated by the dotted line 18b. It will be seen that this curve will be of the general form needed for correction. This liquid curve 18b may then be altered experimentally until it provides the precise aspheric surface of revolution needed to correct the residual axial spherical aberration of the system. When correction of spherical aberration becomes significantly improved the shadow fringes shown in FIGURE 5B will decrease in number as shown in FIGURE 5C and will become less curved. When correction is "perfect" all fringes will be replaced by a uniformly-illuminated field which is equivalent to one broad fringe as shown in FIGURE 5D. Alteration of the form of curve 18b may be accomplished by experimental variations in spacing d and voltage V for a given plate 21. However, before achieving a "perfect" corrector it will, most probably, also be necessary to conduct experiments with other plates in which ring 21c is wider or narrower, or of larger or smaller diameter. Ring 21d and disc 21a are grounded as a precaution against the unsymmetrical accumulation of electric charge on the insulating glass surface inside and outside of ring 21c. The insulating glass spaces between rings 21c and 21d and between ring 21c and center disc 21a should be as narrow as possible consistent with the insulation required.

In some cases it also may be desired to vary the inside diameter of wall 19a in order to utilize peripheral effects due to surface tension. In other cases it may be necessary to provide a number of concentric rings similar to ring 21c about the central disc, each ring being connected to the potentiometer 27b at a different potential point by means of a number of adjustable contacting elements 27c. Such a multiple ring arrangement would be particularly useful in the experimental derivation of Schmidt type correctors for reflecting type telescopes or projection optical systems. However, since Schmidt type correctors are opposite to the type used in this invention and are thicker in the center than at the edge, it will be clear that a different arrangement of electrode rings and ring potential distribution will be required for Schmidt type correctors than that used to form correctors of the type in this invention. Formation of Schmidt type correctors for reflecting telescope systems would also not require the type of test system used in this invention but would require use of the conventional telescope autocollimating test system. In the conventional autocollimating test system the flat mirror is of the same aperture as the optical system and is located between the corrector and infinity while the grid test pattern is located at the image plane.

With a multiplicity of rings, each having a variable electrical potential and with various spacings $d$ and with various inside diameters $d_1$, it will be clear that substantially any necessary corrector may be derived experimentally for any optical system. It is important to note that surface tension causes smoothing or blending of the curves produced by the one or more electrodes used. Due to surface tension the discontinuities in the electric field due to the steps from one electrode to the next are considerably attenuated. In addition, peripheral surface tension effects may be used to advantage. For example, if the inside surface of wall 19a is coated with a material that does not become "wetted" by the material from which the corrector is being formed the peripheral curve form needed for a corrector of the type shown in FIGURE 3 may be more easily obtained than for the wetted condition shown in FIGURE 5A.

Support plate 13 shown in FIGURE 1 and the other refractive components subsequently described and shown in FIGURES 6, 6A, 7 and 7A were not included in FIGURE 5 and its related description in order to simplify FIGURE 5 and the description of the basic principle of corrector derivation while under the new optical test system. However, it will be clear that when components 28, 13, 32, 33, 31, and 34 or components 13, 35, 36, 33, 31 and 34 are used they should, be preferably, be included in the system shown in FIGURE 5 using mirror 17 in lieu of object 3.

If, in the system shown in FIGURES 5 and 5A and described above, a plastic material such as a monomeric liquid methacrylate ester and a suitable hardening catalyst such as benzoyl peroxide are used as liquid 18 the above-described procedure will yield a solid corrector element when the plastic material and hardener become rigid. If necessary, a thin transparent layer of electrically-conducting material may be evaporated upon the liquid plastic material to increase the electrical conductivity of its surface.

Other materials with their coacting hardeners or catalysts might be substituted for methacrylate. For example, bisphenol-A/epichlorohydrin liquid resin known commercially as "Epoxy" resin might be used with triethylene tetramine added to the amino ethyl piperazine hardening material. The addition of the aliphatic amine, triethylene tetramine, will produce the necessary electrical conductivity before the material hardens. A short time prior to the date of filing of this patent application, Dr. J. H. Lupinski of the General Electric Company announced before the American Chemical Society the successful development of a new electrically-conducting plastic material.

After the voltage and geometrical parameters and any other related conditions are determined experimentally the above-indicated plastic forming method may be used to produce rigid plastic corrector plates in quantity. If desired, only one plastic master may be made and converted into a quantity-casting mold. However, this type of quantity production by replica casting is covered by numerous published articles in technical journals and patents and, therefore, will not be discussed further in this specification.

Although a plane-parallel glass bottom 20 is illustrated in FIGURES 5 and 5A it will be clear that the glass bottom may also be a convex or concave meniscus or a negative or positive lens, if desired, to achieve any additional characteristic not obtainable with a plane-parallel plate. The "glass" bottom material may also be Pyrex, quartz, sapphire or any other material transparent to the radiation employed as well as plastic material.

Although the above-described method of corrector plate formation utilizes a hardenable transparent plastic material, molten glass or other non-plastic materials might be used. To avoid complications due to electron emission at the high melting temperatures of glass and other similar materials the ground terminal may be made the positive terminal. If further required, the heating and forming process may be conducted in vacuo or in an inert gas.

It will also be clear that when the proper geometric and voltage parameters are determined for any particular liquid or plastic material using the test set-up shown in FIGURES 5 and 5A it will be possible to produce closely-equivalent corrector plates without the test set-up using glass or other non-plastic materials. This procedure would eliminate the somewhat awkward problem of maintaining the glass in a liquid condition while in the test set-up shown in FIGURES 5 and 5A.

While the use of centrifugal force was referred to as a non-preferred force above in this description the use of centrifugal and gravity force may prove useful in some cases. The behavior of rotating liquids is well known and has been used to produce both temporary and permanent parabolic telescope mirrors. It will be clear that centrifugal and gravity force used in combination with surface tension or electrostatic force, or both surface tension force and electrostatic force offers an enormous number of possible aspheric corrector curve forms which may be achieved experimentally and selected as required to yield a uniform field in the optical test set-up previously described in connection with FIGURE 5.

OIL IMMERSION

Figure 6:
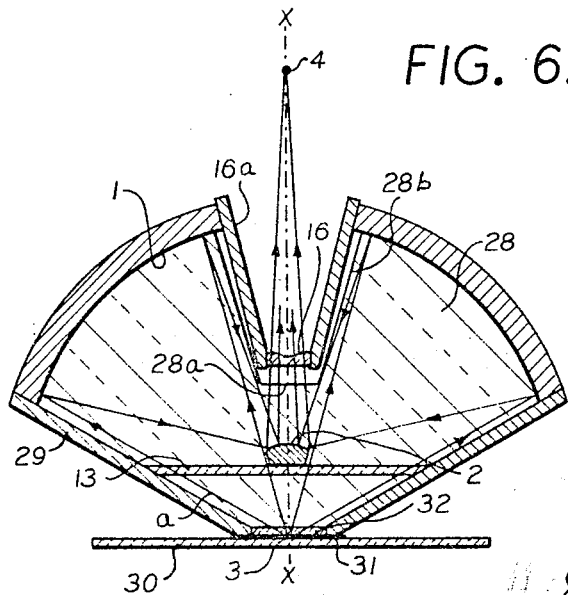
FIGURE 6 shows one means for applying the well-known oil-immersion principle to the new reflective optical system in order to achieve the highest-possible numerical aperture.
Figure 6A:
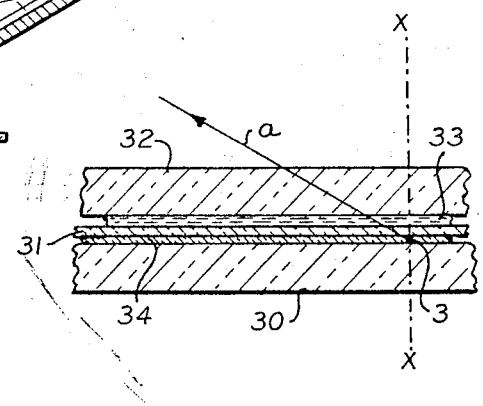
FIGURE 6A shows an enlarged view of some parts shown in FIGURE 6.

When the obect to be magnified is inside a transparent solid or liquid, as in the case of a specimen contained within a conventional microscope slide, the optical system previously described may be encased in a solid or liquid transparent material 28 as shown in FIGURES 6 and 6A. In this system convex mirror 2 may be supported or "potted" within a solid or liquid transparent material 28 which is contained more or less within the bowl of larger convex mirror 1. If desired, mirror 2 may be supported upon a transparent plastic or glass plate 13 and the potting material 28 may be cast on either side of plate 13. The transparent material 28 may, if desired, be contained within a housing 29. The corrector is located as close as possible to mirror 2 and a flat optical surface 28a perpendicular to axis X—X is provided at the bottom of hole 28b in material 28. An enlarged image 4 is formed of a small object 3 located in a transparent refractive medium 34 between a glass slide 30 and a cover glass 31.

When transparent material 28 is a liquid, mirror 2 would, of course, have to be supported by a transparent solid plate 13 as also shown in FIGURE 1 and optical surface 28a would have to be provided by a transparent solid window. The transparent material should, preferably, have a high optical index of refraction. In practice, however, the class of materials known commercially as "Plexiglas," "Lucite," "Epoxy," etc. or the class, glass, "Pyrex," sapphire, quartz, etc. should give excellent results. If material 28 is a soft plastic or a liquid a plate 32 constructed of glass, quartz or sapphire may be added to prevent damage to the soft material, or to retain it, as shown in FIGURE 6A.

The space between plate 32 and cover glass 31 of specimen slide 30 should, preferably, be bridged by a liquid 33 (usually oil in conventional microscopes) to maintain a continuity of optical refractive index substantially the same as that of transparent solid materials 31 and 32. This procedure is termed "oil immersion" when oil is used between the cover glass and the first lens surface of a conventional refractive objective which is in a position comparable to plate 32 in this invention. In general, the refractive indices of cover glass 31, oil 33, plate 32, material 28, should be equal to or preferably somewhat greater than that of transparent material 34 which immediately surrounds object 3.

Surface 28a may also be curved, if desired. For example, surface 28a might be an optically-accurate spherical surface or it might be formed by the aspheric corrector itself. This latter arrangement could be accomplished by cementing the corrector element to surface 28a with its glass bottom 20 cemented to surface 28a. By this means support structure 16a could be eliminated and the corrector therefore located as close as possible to mirror 2.

Figure 7:
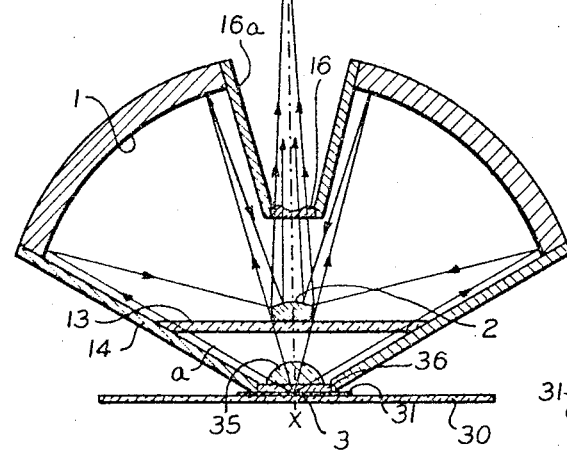
FIGURE 7 shows another means for applying the well-known oil-immersion principle to the new reflective optical system in order to achieve the highest possible numerical aperture.
Figure 7A:
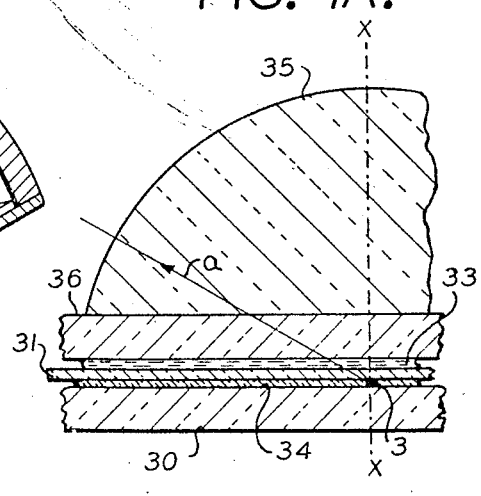
FIGURE 7A shows an enlarged view of some parts shown in FIGURE 7.

An alternate means for providing oil immersion operation with this type of reflective microscope can be provided by an auxiliary spherical lens 35 as shown in FIGURES 7 and 7A. In this case both mirrors 1 and 2 would be situated in air and liquid or solid material 28 would not be used. Lens 35 and protective window 36 may be made of any material transparent to the radiation being used, preferably a material of high refractive index. The center-of-curvature of lens 35 should fall close to the object 3.

Referring to FIGURES 7 and 7A the rays from a small object 3 imbedded in a transparent material 34 will pass through material 34, cover glass 31, oil 33, protective window 36, lens 35 in a nearly straight line or, preferably, will be bent slightly toward axis X—X if the refractive indices are successively higher. If the surface of lens 35 is properly located the rays within lens 35 will pass into air close to perpendicular to the solid-air interface without deviation. After passing this interface the rays will be reflected by mirror 1 and mirror 2 and, thence, through corrector 16 to image point 4. It will be seen that the use of lens 35, window 36 and oil 33 enables the angle between ray and axis X—X to remain as large or larger in the imbedding material 34 than where ray $a$ is in air between mirror 1 and lens 35. This condition therefore assures maximum numerical aperture. If lens 35, window 36 and oil 33 were not used the angle between ray $a$ and axis X—X would be smaller in imbedding material 34 than where ray $a$ is in air between mirror 1 and lens 35. Reduction of the above angle in imbedding material 34 would, therefore, reduce the numerical aperture and, hence, the resolution of fine details.

IMPORTANT SYSTEM CHARACTERISTICS

As this system utilizes the best average compensation of spherical aberration of a very large concave mirror 1 by a very small convex mirror 2, in its preferred form, the center dark spot may be considerably less than 30% of the full aperture and the working distance may be substantially greater than the equivalent focal length of the system. These characteristics, therefore, permit the system to be used at high numerical apertures and magnifications with micromanipulation apparatus and tools having substantially greater depth and complexity than is possible with conventional microscope objectives. To achieve the highest numerical apertures for specimens situated within a liquid spherical lens 35 would be made as large as possible and its flat surface would be brought into contact with the specimen-containing liquid so that this liquid could be as thick or deep as possible within the space occupied by elements 36, 33, 31, and 34 in FIGURE 7A. To achieve the highest possible numerical apertures with maximum working distances in a liquid in the system shown in FIGURES 6 and 6A it would only be necessary to fill the space between support window 13 and the specimen 3 with the liquid. Compensation for small variations in the refractivity of the specimen-immersing liquid could be accomplished by appropriate small axial displacements of corrector 16.

Various means for achieving correction of residual axial spherical aberration in the new reflective type optical system and for the non-mathematical derivation of corrector plate curves, and for fabrication of corrector plates have been illustrated and described together with various means for adapting the oil-immersion feature to the new reflective optical system. Various changes and modifications can be made and some features can be used in different combinations without departing from the invention as defined in the claims.

What is claimed is:

1. Method of producing an aspheric, substantially axially symmetric lens comprising: providing an electrically conductive liquid lens-forming material in an electrically conductive container, providing a free surface of said liquid, impressing predetermined varied electrostatic potential transversely to said liquid surface whereby to contort such liquid into a predetermined shape at said surface and then solidifying said contorted liquid in said predetermined shape.

2. Method as claimed in claim 1, wherein said liquid lens-forming material is a conducting, substantially optically clear, polymeric material.

3. Method as claimed in claim 2, wherein said polymeric material is a member selected from the group consisting of acrylic polymers and epoxy polymers.

4. Method as claimed in claim 3, wherein said liquid contains a hardening catalyst.

5. Method as claimed in claim 4, wherein said catalyst is a peroxide.

6. Method as claimed in claim 2, including passing light through said liquid and through said element assembly and comparing said light as transmitted with a known light source whereby to determine the desired shape of said surface.

7. Method as claimed in claim 1, wherein said elements are a thin film of a material selected from a member of the group consisting of gold and antimony deposited on a substantially optically clear material.

References Cited

UNITED STATES PATENTS

| 2,332,674 | 10/1943 | Smith | 264—1 |
| 2,332,930 | 10/1943 | Rinia | 264—1 |
| 3,274,301 | 9/1966 | Kulp | 264—1 |
| 3,321,391 | 5/1967 | Warfield et al. | 264—22 |

FOREIGN PATENTS 15,231   8/1963   Japan.

JULIUS FROME, Primary Examiner.

A. H. KOECKERT, Assistant Examiner.

U.S. Cl. X.R.

18—5; 264—22